UNITED STATES PATENT OFFICE 2,575,088

ELECTRIC ACCUMULATORS

Montefiore Barak, Clifton Junction, near Manchester, England, assignor to The Chloride Electrical Storage Company Limited, Clifford Junction, near Manchester, England No Drawing. Application March 20, 1950, Serial No. 150,817. In Great Britain July 23, 1948

1 Claim. (Cl. 136—26)

The pastes used in the plates of lead-acid type electric accumulators are made by mixing one or more of the oxides of lead or mixtures of lead oxide and finely-comminuted lead with sulphuric acid and water in suitable proportions. Various chemical reactions may occur in the mixture, including the formation of lead sulphate and the hydrated basic sulphates of lead. The reactions which produce these substances are exothermic and considerable heat is evolved. The temperature of the mixture rises steadily during mixing and may reach about 150° F. Also, as the temperature of the paste rises, not only is the velocity of the reaction accelerated but there is a possibility that the reactions leading to cementation, described hereinafter, may be initiated.

By investigation and experiment I have found that by suitably limiting the maximum temperature attained during the formation of the paste, I am enabled to reduce appreciably the time of mixing, thereby ensuring that the cementation reactions do not start at this stage and in this way I obtain a more effective cementation and interlocking or bonding of the intercrystalline formations in the paste during the actual setting of the paste in the plates. In other words, the chemical reactions which take place in the mixture are delayed to the extent that the main portion of the dehydration or loss of water (which appears to determine the cementation at setting) occurs after pasting the plate and therefore the rigid interlocking of the crystalline forms in the paste occurs after the paste has been manipulated in being transferred to the grids. If it occurs before such transfer as in present practice, then the interlocked crystals are broken down during manipulation and a much less rigid paste structure results.

Thus my researches and experiments have provided for an increased life of the active material due to its increased resistance to physical disintegration.

My invention comprises limiting the temperature of the reaction mixture from which the active paste is produced to a maximum of about 120° F. before the mixture is manipulated for transfer to the grids of plates, and limiting the duration of mixing to a maximum of 20 minutes so that the completion of the reaction in the mixture is thereby delayed until the setting stage of the paste in the grids or plates.

The cooling of the mixer may be effected in any convenient manner, such as by water jacketting or water spraying the outside of the mixer.

What I claim is:

In the production of the active paste used in the plates of lead-acid type electric accumulators by reacting one or more of the oxides of lead or mixtures of lead oxide and finely comminuted lead with sulphuric acid and water in suitable proportions, limiting the temperature of the reaction mixture to a maximum of about 120° F. before the mixture is manipulated for transfer to the grids or plates and limiting the duration of mixing to a maximum of 20 minutes so that the completion of the reaction in the mixture is thereby delayed until the setting stage of the paste in the grids or plates.

MONTEFIORE BARAK.

REFERENCES CITED

The following references are of record in the file of this patent:

UNITED STATES PATENTS

| Number | Name | Date |
|---|---|---|
| 1,374,076 | Grimditch | Apr. 5, 1921 |
| 2,219,404 | Simpson | Oct. 29, 1940 |